US005195493A

United States Patent [19]

Re

[11] Patent Number: 5,195,493

[45] Date of Patent: Mar. 23, 1993

[54] ADJUSTABLE ELECTRONIC FUEL MANAGEMENT SYSTEM FOR VEHICLE ENGINES

[75] Inventor: Ron Re, Wilmington, Del.

[73] Assignee: Re-Tech, Inc., New Castle, Del.

[21] Appl. No.: 900,307

[22] Filed: Jun. 18, 1992

[51] Int. Cl.[5] ........ F02M 37/04; B01D 47/00

[52] U.S. Cl. ........ 123/510; 261/DIG. 31; 261/36.2; 261/26

[58] Field of Search ........ 123/510, 33, 438; 261/DIG. 81, 36.2, 72.1, 26

[56] References Cited

U.S. PATENT DOCUMENTS

| | | | |
|---|---|---|---|
| 3,196,926 | 7/1965 | Gartland | 261/DIG. 81 |
| 3,800,769 | 4/1974 | Graffman | 261/36.2 |
| 4,000,224 | 12/1976 | Phelps | 261/36.2 |
| 4,098,236 | 7/1978 | Okawa | 261/36.2 |
| 4,457,281 | 7/1984 | Ueyama et al. | 123/460 |
| 4,824,613 | 4/1989 | Scott et al. | 261/36.2 |

FOREIGN PATENT DOCUMENTS

| | | | |
|---|---|---|---|
| 0056223 | 9/1977 | Japan | 123/DIG. 81 |

*Primary Examiner*—E. Rollins-Cross
*Assistant Examiner*—Thomas Moulis
*Attorney, Agent, or Firm*—Connolly & Hutz

[57] ABSTRACT

A fuel management system for reducing pollution when an internal combustion engine is at idle includes a flow control valve located between the fuel tank and the float bowl of the carburetor to reduce the amount of fuel entering the carburetor. A pump is also provided between the fuel tank and the float bowl for removing the existing fuel from the float bowl and conveying it back to the fuel tank when the engine is at idle. The flow control valve in its reduced flow state and the pump are inactivated until the engine reaches a predetermined pressure at which time the existing fuel would be removed by the pump from the float bowl and the flow control valve would permit only a reduced flow of fuel to be conveyed to the float bowl sufficient to keep the engine running.

13 Claims, 2 Drawing Sheets

ADJUSTABLE ELECTRONIC FUEL MANAGEMENT SYSTEM FOR VEHICLE ENGINES

BACKGROUND OF THE INVENTION

The present invention is directed to reducing pollution (HC and CO) when the internal combustion engine of a vehicle is at idle. According to the ENVIRONMENTAL AND ENERGY STUDY CONFERENCE, SPECIAL REPORT of Apr. 18, 1990, the Senate and House Energy Commissions approved clean air bills that contain stringent new requirements to cut pollution from cars, trucks and buses. Also stated was the fact that vehicles are responsible for 90% of the carbon monoxide and 45% of hydro carbons in many cities.

More emission controls are needed in the area of idle and cold start of an engine. It is known that an engine creates the greatest amount of pollution at idle. Most existing fuel systems in the automobile engines deliver more fuel to the engine at idle than the engine can possibly burn which creates higher levels of HC and CO at idle.

All emission testing is done in the idle mode at the time of state inspections.

All present existing pollution control devices on vehicles do not reduce the pollution at idle except for the catalytic converter which reduces the HC and CO, but only to a minimum in a two stage converter. The new three stage converter in the newer automobiles "appears" to drastically reduce HC and CO at idle, when actually it only disguises the true level of HC and CO that enters the atmosphere as fresh air is pumped into the catalytic converter, then mixes with the gases in the catalytic converter before coming out of the tailpipe.

SUMMARY OF THE INVENTION

An object of this invention is to provide a fuel management system that permits the minimum amount of fuel to flow into the engine, yet still maintains the proper amount of fuel the engine needs without the fuel being too lean or too rich and while still drastically reducing the pollution at idle.

A further object of this invention is to provide such a system which is an adjustable electronic fuel management system that not only reduces the HC and CO pollution by controlling the amount of fuel going into the carburetor at idle, but also reduces the amount of fuel usage at idle.

In accordance with this invention the fuel management system takes the fuel out of the float bowl and sends it back to the fuel tank by means of an electric fuel pump. As a result, a considerable amount of fuel is saved under normal operating conditions.

The fuel management system also includes an adjustable flow control valve which controls the amount of fuel entering the carburetor at idle. Thus, the electric fuel pump removes all of the existing fuel out of the float tank of the carburetor at idle and a reduced controlled amount of fuel is permitted to flow into the carburetor of an amount just sufficient to keep the engine running.

THE DRAWINGS

DETAILED DESCRIPTION

Figures 1, 2:
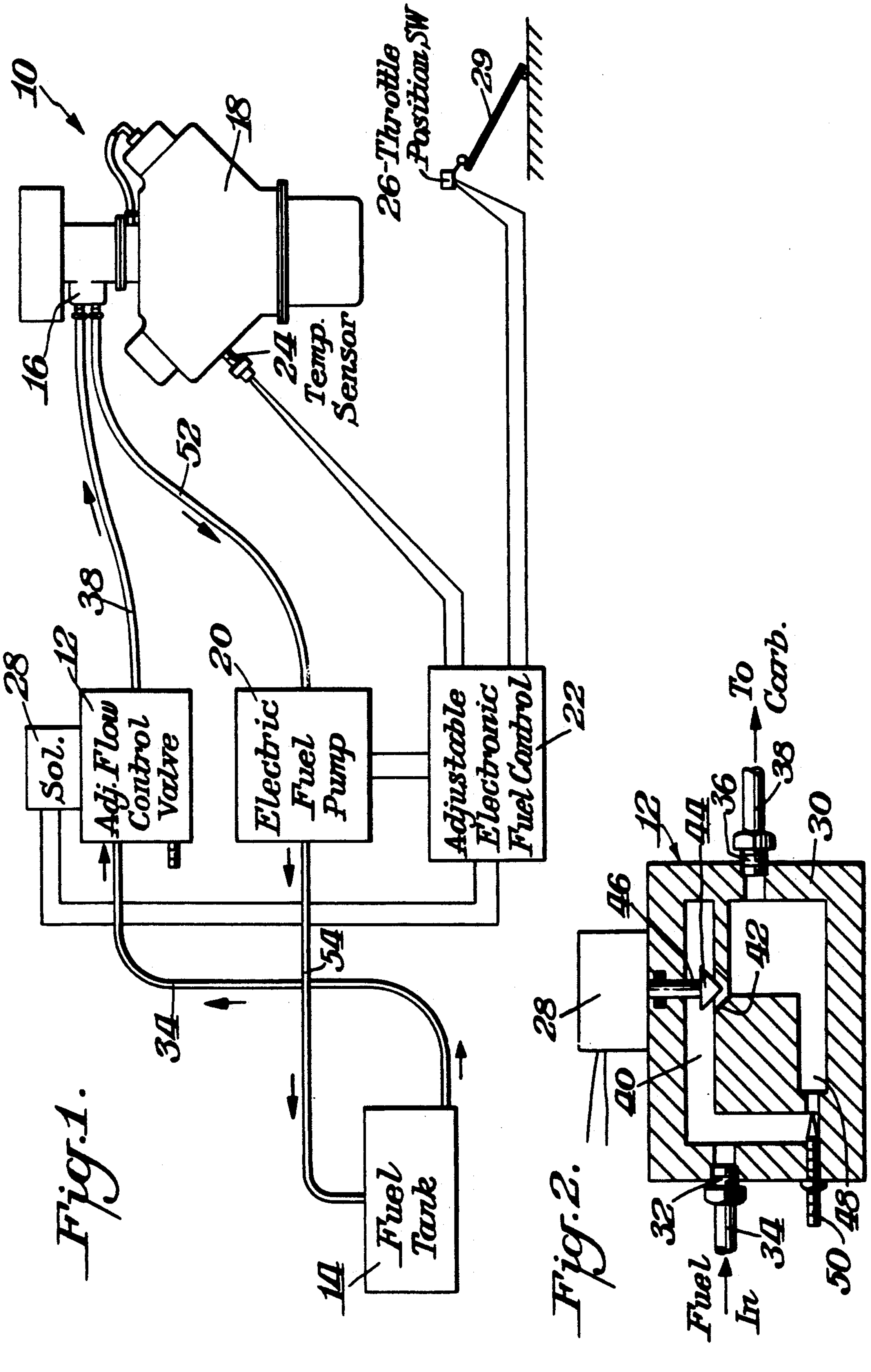
FIG. 1 is a schematic view illustrating an adjustable electronic fuel management system in accordance with this invention.
FIG. 2 is a cross-sectional view in elevation of the adjustable flow control valve shown in FIG. 1.

In general, the fuel management system 10 of this invention utilizes an adjustable flow control valve 12 which controls the amount of flow of fuel from fuel tank 14 to the float bowl 16 of the carburetor in engine 18. System 10 also includes an electronic fuel pump 20 located between the fuel tank 14 and float bowl 16 to remove existing fuel in the float bowl when the system 10 is actuated and to direct the fuel back to fuel tank 14.

As also shown in FIG. 1, system 10 includes an adjustable electronic fuel control 22 which is associated with a temperature sensor 24 and a throttle position switch 26 to control the actuation and inactivation of system 10.

In general, system 10 functions to control the amount of fuel entering the carburetor through the use of adjustable flow control valve 12 and its solenoid 28. Thus, during normal conditions when the engine is not at idle adjustable flow control valve 20 could permit full flow of fuel from fuel tank 14 to engine 18. Under idle conditions, however, the amount of flow would be drastically reduced so that only enough fuel flows into float bowl 16 which is sufficient to keep the engine 18 running.

System 10 also functions to remove the existing fuel out of the float bowl 16 when electric fuel pump 20 is actuated. The actuation of electric fuel pump 20 and the solenoid 28 which reduces flow through valve 12 is controlled so that actuation does not occur until the engine 18 reaches its normal operating temperature as sensed by temperature sensor 24.

In addition to utilizing the operating temperature to control the operation of system 10, system 10 also incorporates throttle position switch 26 to detect or sense when the throttle is at the idle position. Throttle position switch 26 is illustrated in FIG. 1 as being positioned off the foot pedal 29. It is to be understood, however, that throttle position switch 26 may be located at any other suitable location, such as at the carburetor itself.

Since different vehicles have different float bowl capacities and may have different operating temperatures, an adjustable electronic fuel control 22 is utilized to factor in the necessary parameters for a specific vehicle. This would be accomplished by any suitable circuitry wherein, for example, fuel pump 20 would be actuated when sensor 24 detects a predetermined temperature corresponding to the operating temperature and fuel pump 20 would remain actuated for a period of time correlated to the size of the float bowl so that the fuel in the float bowl at the time pump 20 is actuated would be removed and then pump 20 would be inactivated so that the reduced flow from valve 12 could continue to function by flowing into float bowl 16 and to the carburetor. AS noted, the actuation of adjustable electronic fuel control 22 is also controlled by throttle position switch 26.

FIG. 2 illustrates in cross-section details of a suitable adjustable flow control valve 12 with its solenoid 28. As shown therein adjustable flow control valve 12 is in the form of a block 30 having a fuel inlet connector 32 which is connected to the hose 34 leading to fuel tank 14. An outlet connector 36 in turn is connected to a hose 38 leading to the carburetor through float bowl 16. A main passageway 40 communicates between fuel inlet 32 and fuel outlet 36. A valve seat 42 is provided in a shoulder in main passageway 40 and is selectively opened and closed by conical valve member or head 44 which extends from stem 46 of solenoid 28. Thus, when solenoid 28 is actuated valve closure member 44 is directed against valve seat 42 to completely close the main passageway 40. A bypass passageway 48 also communicates inlet 32 without outlet 36. An adjustable valve 50 is disposed in bypass passageway 48 to control the amount of flow which reaches outlet 36 through bypass passageway 48. Valve member 50 may be of any suitable construction such as a needle valve. As illustrated, member 50 is threaded for ready adjustment to the desired reduced flow. Member 50 is located at the 90° turn of passageway 48.

In operation, valve member 50 may have a one time setting which, of course, could be adjusted whenever desired. The setting of valve 50 would correspond to the reduced amount of flow, just sufficient to keep engine 18 running. Accordingly, when engine 18 is at idle, solenoid 28 would be actuated to close main passageway 40 and flow would continue through outlet 36 and pipe 3 by passing around valve 50 in bypass passageway 48.

Valve 12 may alternatively be constructed with a single flow passageway having a valve member therein. The reduced flow could be obtained by only partially closing the valve member. The degree of closure could initially be manually adjusted for selecting the desired amount of reduced flow. Thus, although the embodiment of FIG. 2 is preferred for the valve structure, the invention may broadly be practiced with either embodiment wherein there is a fuel flow line which is at least partially closable whether that line be a single line or two passageways as in FIG. 2.

FIG. 1 illustrates the general operation of system 10. As shown therein fuel enters fuel inlet hose 34 from fuel tank 14 and passes into adjustable flow control valve 12. The fuel then passes through fuel outlet hose 38 and enters carburetor float bowl 16. The adjustable electronic control 22 is activated when the engine 18 reaches its operating temperature, such as a minimum of 160° F. The reaching of this predetermined temperature is determined by temperature sensor 24. The throttle position sensor switch 26 activates solenoid 28 when the idle position is detected to shut off the fuel flow through passageway 40 of valve 12. Flow continues, however, past flow control adjustment valve 50 to the carburetor. At the same time, the electronic fuel pump 20 is activated which pulls fuel from float bowl evacuation hose 52 through fuel pump 20 and then through fuel outlet hose 54 back to fuel tank 14.

Figure 3:
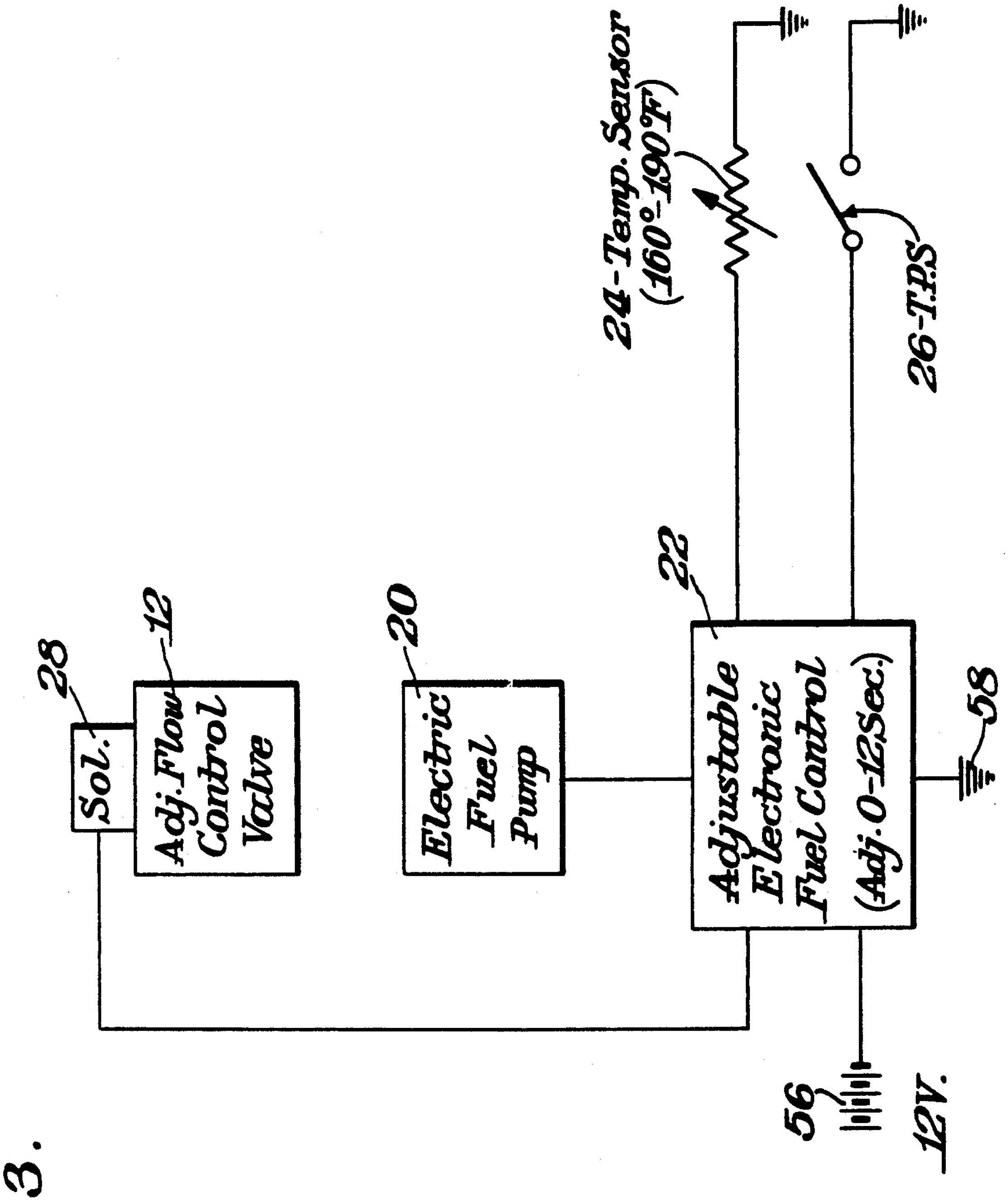
FIG. 3 is a schematic view showing the interrelationship between various components in the system shown in FIGS. 1-2.

FIG. 3 illustrates the relationship of various components in system 10. AS shown therein adjustable electronic fuel control 22 would be powered by any suitable power source 56 and would also be grounded as indicated by the reference numeral 58. Power source 56 could, for example, be a suitable 12 volt battery. Ground 58 could be the chassis ground. Through suitable circuitry adjustable electronic fuel control 22 could be set to a preselected temperature, such as in the range of 160°-190° F., which would correspond to the operating temperature of engine 18. This temperature would be sensed by sensor 24. Additionally, adjustable electronic fuel control 22 could include a timing mechanism which would be adjustable up to for example 12 seconds to control the time duration that electronic fuel pump 20 is activated.

When the preselected operating temperature is sensed by sensor 24 and when switch 26 detects the throttle to be at the idle position, adjustable electronic fuel control 22 is actuated which in turn causes the actuation of solenoid 28 to reduce the flow of fuel through valve 12. Fuel pump 20 is also actuated to evacuate the fuel from the float bowl for a preset period of time which is selected to correlate with the capacity or volume of fuel in a specific float bowl. Thus, while the vehicle is in the idle position, fuel has been evacuated from the float bowl and only a reduced controlled amount of fuel continues to flow through control valve 12. These conditions are maintained while the vehicle is at idle. When switch 26 detects the throttle position to be no longer at idle, solenoid 28 is activated to its open position so that full flow of fuel is resumed through valve 12. Pump 20 remains inactivated. The system remains on while at its operating temperature. When the vehicle again returns to idle the throttle position is again detected by sensor 26 to reduce the flow by means of solenoid 28 and electric fuel pump 20 is reactivated to again evacuate fuel bowl 16.

The effectiveness of fuel management system 10 has been demonstrated in actual tests. All testing was done using the Allen Diagnostic Computer Digital Engine Analyzer on a 1974, GM, 350 cubic inch, 270 horsepower engine with a 4 barrel carburetor with 80,000 miles on the engine.

The engine was tuned up and parts replaced were a new electronic distributor, distributor cap, spark plug wires, spark plugs and coil. The carburetor was replaced with a 1980 quadrajet 4 barrel as this carburetor is more efficient than the 1974 quadrajet carburetor.

The following tests were performed with the use of the fuel management system 10.

The test results clearly show the reductions of the %CO and the ppm HC.

The following are results of cold start, choke on, fast idle.

| FAST IDLE, CHOKE ON, COLD START | FAST IDLE OFF, CHOKE OFF, ENGINE WARM AT IDLE |
|---|---|
| RPM 1313 | RPM 741 |
| % CO 0.00 ppm HC O | % CO 0.00 ppm HC O |
| % CO2 12.6% O2 1.3 | % CO2 13.6% O2 0.0 |
| The following are results of 3 cruise ranges and idle. | |
| LOW CRUISE | MEDIUM CRUISE |
| RPM 1548 | RPM 2086 |
| % CO 0.00 ppm HC O | % CO 0.00 ppm HC O |
| % CO2 12.8% O2 0.6 | % CO2 12.4% O2 1.5 |
| HIGH CRUISE | IDLE |
| RPM 3056 | RPM 728 |
| % CO 0.00 ppm HC O | % CO 0.00 ppm HC O |
| % CO2 13.4% O2 0.9 | % CO2 12.6% O2 1.5 |

As can be appreciated system 10 thus operates to control the flow of fuel to the carburetor and can be adjusted in accordance with the size of the specific engine. The flow volume would ordinarily vary between two conditions. One where there is full flow of fuel and the other where the fuel flows only past the flow control adjustment screw 50 to the carburetor. When the electric fuel pump 20 is actuated the float bowl is evacuated of existing fuel, but the evacuation is only for a time sufficient to initially evacuate float bowl 16, but then permit the trickle of sufficient fuel past needle valve 50 into the carburetor.

System 10 is advantageous in the various adjustability features which are possible. For example, there may be a manual adjustment to control the length of time that electric fuel pump operates based on the size of a carburetor since smaller carburetors have less fuel in the float bowl than larger carburetors. Additionally, valve 50 could be adjusted to assure that only a sufficient amount of fuel enters the carburetor to keep the engine 18 running. Further, the temperature at which system 10 would be actuated is also controlled since different engines have different operating temperatures.

What is claimed is:

1. A fuel management system for reducing pollution when an internal combustion engine is at idle wherein the engine includes a carburetor having a float bowl and fuel is fed from a fuel tank to the float bowl, comprising fuel flow control valve means between said fuel tank and said float bowl for controlling the amount of fuel flow from said fuel tank to said carburetor to selectively permit full fuel flow and reduced fuel flow, pump means communicating with said float bowl for selectively removing fuel from said float bowl, and control means connected to said fuel flow control valve means and to said pump means for activating said fuel flow control valve means to its reduced fuel flow condition when said engine is at a predetermined temperature and at idle and for activating said pump means and controlling the period of time of activation of said pump means when said engine is at idle whereby fuel is removed from said float bowl by said pump means and the flow of fuel to said float bowl through said fuel flow control valve means is reduced when said engine is at idle.

2. The system of claim 1 wherein said control means includes a temperature sensor mounted to said engine for determining when said predetermined temperature has been reached, and said control means including a throttle position switch for determining when said engine is at idle.

3. The system of claim 2 wherein said control means is adjustable to preselect said predetermined temperature and to preselect said period of time of activation of said pump means.

4. The system of claim 3 wherein said fuel flow control valve means includes a full flow line mounted between said fuel tank and said float bowl, and a valve member mounted in said full flow line for reducing the flow through said full flow line when said valve member is actuated.

5. The system of claim 4 wherein said full flow line comprises a full flow passageway and a bypass passageway between said fuel tank and said float bowl, and said bypass passageway having less flow capacity than said full flow line.

6. The system of claim 5 wherein said valve member is movable to an open position for permitting full flow of fuel through said full flow passageway and a closed position for preventing flow of fuel through said full flow line.

7. The system of claim 6 wherein said valve member is part of a solenoid valve.

8. The system of claim 7 wherein said solenoid valve includes a conical head, said full flow passageway having a conical seat, and said conical head being selectively movable into contact with said conical seat for preventing flow through said full flow passageway.

9. The system of claim 8 including an adjustable valve element in said bypass passageway for controlling the amount of flow through said bypass passageway.

10. The system of claim 9 wherein said adjustable valve element is a screw valve.

11. The system of claim 10 wherein said fuel flow control valve means includes a block, an inlet passage mounted to said block, an outlet passage mounted to said block, said full flow passageway extending from said inlet passage to said outlet passage and through a shoulder in said block, said conical seat being formed in said shoulder, said bypass line extending from said inlet passage and having a 90° turn and then extending to said outlet passage and said valve element being mounted at said 90° turn.

12. The system of claim 3 wherein said pump means is an electric pump.

13. The system of claim 3 wherein said predetermined temperature is in the range of 160°-180° F., and said period of time of activation of said pump means being no greater than 12 seconds.

* * * * *